United States Patent [19]

Loth et al.

[11] Patent Number: 5,418,073
[45] Date of Patent: May 23, 1995

[54] METHOD OF FORMING NOISE-DAMPING COMPOSITE WITH EXTERNALLY GALVANIZED SURFACES AND COMPOSITE FORMED THEREBY

[75] Inventors: Michael R. Loth, Palos Hills; Ronald L. Millar, Wheaton, both of Ill.; Thomas E. Moore, Perrysburg, Ohio; Edward J. Vydra, Northbrook, Ill.; James A. Rogers, Milford, Mich.

[73] Assignee: Pre Finish Metals Incorporated, Elk Grove Village, Ill.

[21] Appl. No.: 140,864

[22] Filed: Oct. 25, 1993

[51] Int. Cl.$^6$ .................................. C25D 7/00
[52] U.S. Cl. .................................. 428/625; 205/50;
    205/138; 205/141; 205/152; 205/158; 205/206;
    428/626; 428/935
[58] Field of Search ............... 205/138, 140, 141, 142,
    205/50, 137, 152, 158, 206; 428/624, 625, 626,
    935

[56] References Cited

U.S. PATENT DOCUMENTS

| | | | |
|---|---|---|---|
| 4,038,042 | 7/1977 | Adelman | 428/625 |
| 4,063,004 | 12/1977 | Quinn | 428/626 |
| 4,444,848 | 4/1984 | Shanefield et al. | 428/624 |
| 4,446,173 | 5/1984 | Barrell et al. | 427/206 |
| 4,503,094 | 3/1985 | Breuninger et al. | 427/250 |
| 4,517,254 | 5/1985 | Grapentin et al. | 428/626 |
| 4,650,723 | 3/1987 | Furuya | 428/622 |
| 4,662,997 | 5/1987 | Hirt et al. | 205/138 |
| 4,780,332 | 10/1988 | Pitz et al. | 427/96 |
| 4,917,966 | 4/1990 | Wilde et al. | 428/659 |
| 4,978,582 | 12/1990 | Stamm et al. | 428/551 |
| 5,100,737 | 3/1992 | Colombier et al. | 428/612 |

FOREIGN PATENT DOCUMENTS

| | | | |
|---|---|---|---|
| 57-93139 | 6/1982 | Japan | B32B 15/01 |
| 1-123738 | 5/1989 | Japan | B32B 15/08 |

OTHER PUBLICATIONS

Pre Finish Metals Incorporated brochure for Polycore Composites.
Pre Finish Metals Incorporated brochure for PCX-1 Polycore Composites.
Walbridge Coatings brochure.

*Primary Examiner*—John Niebling
*Assistant Examiner*—William T. Leader
*Attorney, Agent, or Firm*—Emrich & Dithmar

[57] ABSTRACT

A noise-damping composite is formed by providing a sandwich of a viscoelastic layer between two metal skins, the viscoelastic layer including electrically conductive particles distributed therein. The sandwich is passed through a series of cells of an electro-galvanizing line, in each cell the sandwich passing through the nip formed between a charged electrically conductive contact roller and an electrically insulating pressure roller for applying sufficient pressure to insure conductivity from the metal skin engaging the contact roller through the viscoelastic layer to the other metal skin, so that the galvanizing metal is plated on only the outer surfaces of the two metal skins.

10 Claims, 1 Drawing Sheet

U.S. Patent     May 23, 1995     5,418,073
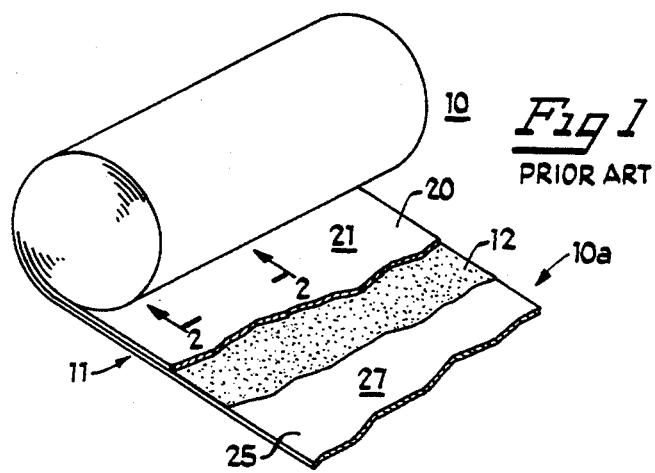
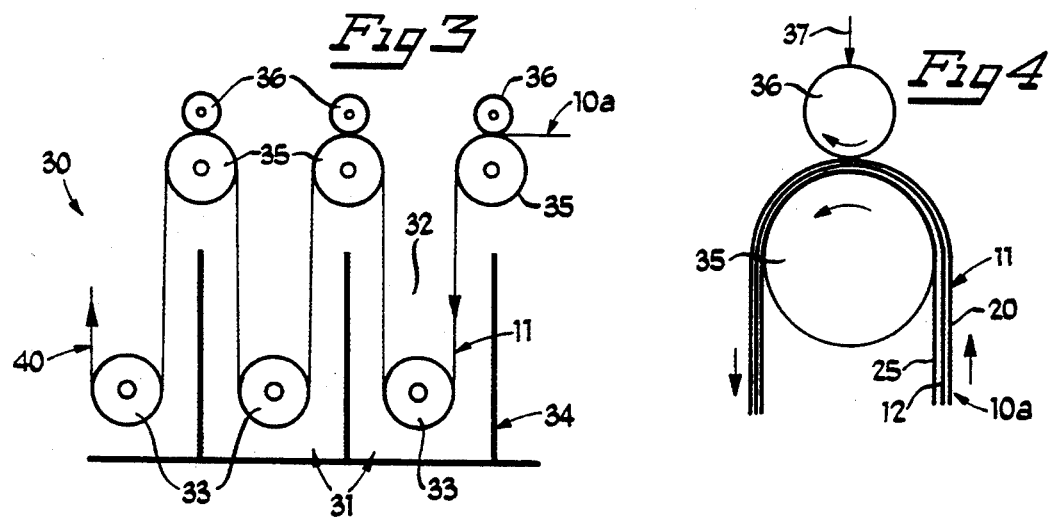
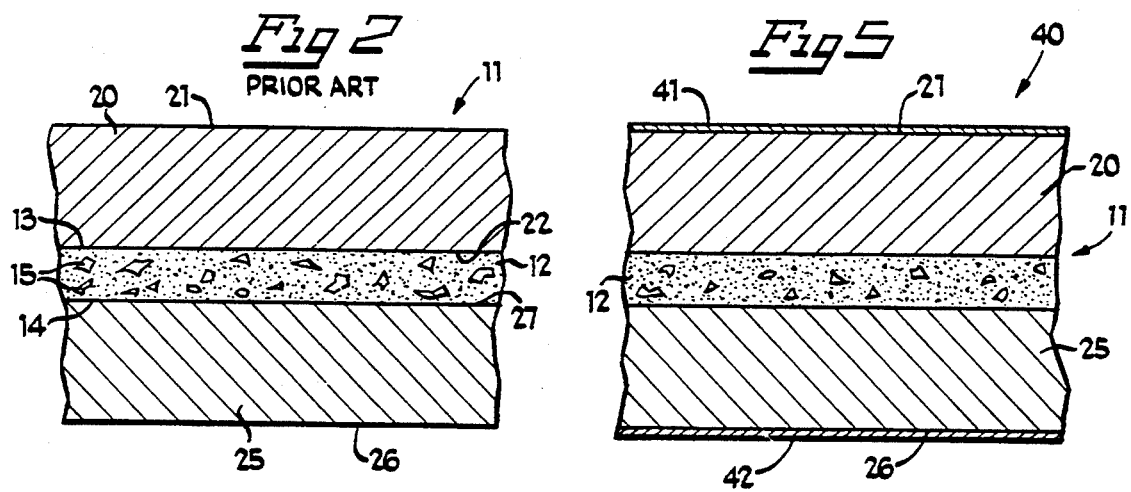

METHOD OF FORMING NOISE-DAMPING COMPOSITE WITH EXTERNALLY GALVANIZED SURFACES AND COMPOSITE FORMED THEREBY

BACKGROUND OF THE INVENTION

1. Field of the Invention

The invention relates to composites including outer metal layers and an intermediate viscoelastic layer for sound and vibration damping characteristics and, in particular, to such composites which are resistance-weldable.

2. Description of the Prior Art

Composites with a thin viscoelastic layer between two metal layers have been used to attenuate noise and vibration and have been used in a number of environments where noise is a problem, especially to diminish the propagation of structural noise and the transmission of air-borne noise. Such environments include automobiles or other vehicles, machinery, business equipment, appliances, power equipment and the like. It is known to provide weldable composites wherein the viscoelastic layer has distributed therein particles of an electrically conductive material to facilitate electrical conduction through the composite, thereby to permit resistance welding of the composite. Such a composite is disclosed, for example, in U.S. Pat. No. 4,978,582.

In many of these applications, it is important that the metal layers of the composite be galvanized to protect them from rust, corrosion and the like. Currently, sound-damped, galvanized composites comprise two sheets of pre-galvanized metal separated by a viscoelastic layer. If the metal layers are pre-galvanized by hot dip galvanizing, then, since each metal layer has the galvanizing metal on both sides, the composite has four layers of zinc, zinc alloys or other galvanizing metal, which makes the composite difficult to weld through. It is possible to electro-galvanize only one side of each metal layer and then laminate the non-galvanized sides together, but this is much more expensive and it is difficult to deal with the thin metal layers used.

Heretofore, a weldable sandwich of two metal layers separated by a viscoelastic layer could not be galvanized after formation of the sandwich. It could not be hot dip galvanized, since the viscoelastic layer would not survive the galvanizing temperature. It could not be electro-galvanized since, in standard electro-galvanizing processes, one surface of the web to be galvanized is passed in electrical contact with a charged conductive roller. In order to plate both outer surfaces of the sandwich, it is necessary for the electric current to pass through the viscoelastic layer to the other metal layer. However, the conductivity of the viscoelastic layer when the material is at rest has typically been insufficient to permit effective electroplating of the outer surfaces of both of the metal layers of the sandwich.

SUMMARY OF THE INVENTION

It is an important object of the +invention to provide an improved composite for attenuating vibrations, which avoids the disadvantages of prior composites while affording additional structural and operating advantages.

An important feature of the invention is the provision of a method for forming a composite of a viscoelastic layer between two metal layers, only the outer surfaces of which are galvanized.

A still further feature of the invention is the provision of a method which permits electro-galvanizing of a pre-formed composite including a viscoelastic layer containing electrically conductive particles and disposed between two metal layers.

Another feature of the invention is the provision of a composite formed by a method of the type set forth.

These or other features are attained by providing a method of forming a resistance-weldable multi-layer composite comprising the steps of: providing a sandwich including a core of viscoelastic material containing electrically conductive particles distributed therein and disposed between two first metal layers, and passing the sandwich through an electroplating cell containing a second metal for depositing a coating of the second metal on only the outer surfaces of each of the first metal layers.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a fragmentary perspective view of a coil of a continuous web of a prior art multi-layer composite;

FIG. 2 is an enlarge, fragmentary view in vertical section taken along the line 2—2 in FIG, 1;

FIG. 3 is a fragmentary, side elevational, diagrammatic view of a portion of a galvanizing line for galvanizing the composite of FIG. 1;

FIG. 4 is an enlarged, fragmentary view of a portion of one of the cells of the galvanizing line of FIG. 3; and FIG. 5 is a view similar to FIG. 2, illustrating the galvanized composite formed by passing the composite of FIG. 1 through the apparatus of FIGS. 3 and 4.

DESCRIPTION OF THE PREFERRED EMBODIMENT

Referring to FIGS. 1 and 2, there is illustrated a coil 10 of a continuous web 10a in the form of a composite sandwich 11. The composite sandwich 11 includes a core layer 12 of a viscoelastic material, such as a suitable acrylic, having opposite surfaces or faces 13 and 14. Substantially uniformly distributed throughout the core layer 12 are particles 15 of a suitable electrically conductive material. The core layer 12 separates two metal layers 20 and 25. The metal layer 20 has an outer surface 21 and an inner surface 22 which is disposed in contact with the surface 13 of the core layer 12. The metal layer 25 has an outer surface 26 and an inner surface 27 which is disposed in contact with the surface 14 of the core layer 12. The metal layers 20 and 25 are preferably of substantially the same thickness, this thickness being in the range of from about 0.0065 to about 0.100 inch. The core layer 12 has a thickness in the range of from about 0.75 to about 4.0 mils, and is preferably approximately 1.0 mil. The metal layers 20 and 25 may be formed of cold rolled steel or any of a number of other suitable metals, depending upon the application for which the composite is to be used. The composite sandwich 11 may be of a form sold by Pre Finish Metals, Inc. under the designation "PCX-1."

In the past, it has been difficult to galvanize the composite sandwich 11 because the conductivity of the core layer 12, at rest, has been insufficient to allow the galvanizing current to flow therethrough, from one of the metal layers 20 and 25 which is in engagement with a contact roller to the other of those metal layers. Thus, it has been very difficult to attain uniform coating depths on both of the metal layer outer surfaces 21 and 26.

Accordingly, referring to FIGS. 3 and 4, there is provided in accordance with the present invention a galvanizing line generally designated by the numeral 30, which includes a series arrangement of a plurality of galvanizing cells 31. While, for simplicity, three of the cells 31 are illustrated in FIG. 3, it will be appreciated that the galvanizing line 30 will typically included a much larger number of such cells. Each of the cells 31 includes a receptacle 34 containing a galvanizing solution 32 including a suitable galvanizing metal, such as zinc or zinc/nickel. Also disposed in each cell 31 is a feed roller 33 which is rotatably driven in a clockwise direction, as viewed in FIG. 3, by a suitable drive mechanism (not shown), in a known manner. Also associated with each cell 31 is an electrically conductive roller 35 which is disposed above the associated receptacle 34 at the upstream end thereof.

In operation, the continuous web 10a of the composite sandwich 11 is fed from a supply thereof over the first conductive roller 35 and the downwardly around the feed roller 33 of the associated cell 31 and then, in turn, around the conductive and feed rollers 35 and 33 of each of the cells 31 in a manner illustrated in FIG. 3, so that the web progresses in the manner indicated by the arrows in FIG. 3. It will be appreciated that each of the conductive rollers 35 is connected to an associated source of electrical potential in a known manner. Referring to FIG. 4, it can be seen that the metal layer 25 of the composite sandwich 11 is disposed in contact with the conductive rollers 35 and it will be understood that, accordingly, the metal layer 20 is disposed in contact with the feed rollers 33. Thus, an electrical charge is imparted to the metal layer 25 by the conductive rollers 35. In the preferred embodiment the conductive rollers 35 are negatively charged.

It is a significant aspect of the present invention that each of the conductive rollers 35 is provided with an associated pressure roller 36, which may be formed of a suitable electrically insulating material, such as rubber, and which is resiliently urged against the associated conductive roller 35 in the manner indicated by the arrow 37 in FIG. 4. The web 10a is fed through the nip defined by the rollers 35 and 36, which cooperate to exert a predetermined pressure on the sandwich 11. This pressure serves to compress the core layer 12, thereby increasing the conductivity thereof sufficiently to ensure adequate conductivity through the web 11 from the metal layer 20 to the metal layer 25 thereof to allow plating of the metal in the cells 31 onto each of the outer surfaces 21 and 26. There results a composite 40, illustrated in FIG. 5, which comprises the composite sandwich 11 with metal coating layers 41 and 42, respectively formed on the outer surfaces 21 and 26 of the metal layers 20 and 25.

In a preferred embodiment of the invention, the force applied by the pressure rollers 36 is such as to exert a pressure of approximately 800 psi on the composite sandwich 11. By use of this technique, zinc coating weights between 30 and 100 $g/m^2$ have been achieved without affecting the physical properties of the composite sandwich 11. Some minimal deterioration of the core layer 12 occurs along the exposed side edges thereof, but this deterioration has been less than $\frac{1}{4}$ inch deep. This is not a detriment, since the marginal edges of the composite 40 are typically removed in a slitting process after galvanization.

From the foregoing, it can be seen that there has been provided an improved composite which is effectively galvanized on only the outer surfaces thereof, and an improved method of making such an composite by permitting galvanization of a composite sandwich including a core layer of viscoelastic material with conductive particles distributed therein.

We claim:

1. A method of forming a resistance-weldable multi-layer composite comprising the steps of: providing a sandwich including a core of viscoelastic material containing electrically conductive particles distributed therein and disposed between two first metal layers, applying a predetermined electrical potential to one of the first metal layers while simultaneously compressing the layers of the sandwich together therby increasing the conductivity of the core, and then passing the compressed sandwich through an electroplating cell containing a second metal while the electric potential is being applied to the sandwich for forming a coating of the second metal on only the outer surfaces of each of the first metal layers.

2. The method of claim 1, wherein the second metal includes zinc.

3. The method of claim 2, wherein the second metal includes nickel.

4. The method of claim 1, wherein the coating of the second metal has a thickness of approximately 30 $g/m^2$.

5. The method of claim 1, wherein the sandwich is provided in a continuous web.

6. The method of claim 5, wherein the web is passed around a feed roller for advancing the web through the electroplating cell, the web also being passed through a nip formed between an electrically charged contact roller and an electrically insulating pressure roller.

7. The method of claim 5, wherein the sandwich is passed sequentially through a series of electroplating cells each containing the second metal.

8. The method of claim 7, wherein for each of the electroplating cells the web is passed around a feed roller for advancing the web through the cell, the web also being passed through a nip formed between an electrically charged contact roller and an electrically insulating pressure roller.

9. The method of claim 1, wherein the layers of the sandwich are subjected to a pressure of approximately 800 psi.

10. The composite produced by the method of claim 1.

* * * * *